(12) United States Patent
Voronenko (10) Patent No.: US 10,045,514 B2
(45) Date of Patent: Aug. 14, 2018

(54) MULTI-PURPOSE ADAPTER FOR MOUNTING FELINE ACTIVITY DEVICES

(71) Applicant: Andrey Voronenko, Lviv (UA)

(72) Inventor: Andrey Voronenko, Lviv (UA)

( * ) Notice: Subject to any disclaimer, the term of this patent is extended or adjusted under 35 U.S.C. 154(b) by 37 days.

(21) Appl. No.: 15/297,154

(22) Filed: Oct. 19, 2016

(65) Prior Publication Data

US 2018/0103613 A1    Apr. 19, 2018

(51) Int. Cl.
| | |
|---|---|
| *A01K 15/02* | (2006.01) |
| *F16M 13/02* | (2006.01) |
| *F16B 2/12* | (2006.01) |
| *F16B 2/08* | (2006.01) |
| *F16B 47/00* | (2006.01) |

(52) U.S. Cl.
CPC ............ *A01K 15/02* (2013.01); *A01K 15/024* (2013.01); *F16B 2/08* (2013.01); *F16B 2/12* (2013.01); *F16B 47/003* (2013.01); *F16M 13/022* (2013.01); *F16M 13/025* (2013.01)

(58) Field of Classification Search
CPC ......... A01K 15/02; A01K 15/024; F16B 2/08; F16B 47/003; F16B 2/12; F16M 13/025; F16M 13/022
USPC ................. 119/706; 248/200, 220.21, 205.3
See application file for complete search history.

(56) References Cited

U.S. PATENT DOCUMENTS

| | | | | |
|---|---|---|---|---|
| 3,085,551 A * | 4/1963 | Helmer | ................ | A01K 15/024 119/706 |
| 5,450,819 A * | 9/1995 | Gray | .................... | A01K 15/024 119/706 |
| 8,418,655 B2* | 4/2013 | Yu | .......................... | A01K 15/024 119/706 |
| 2001/0045191 A1* | 11/2001 | Gear | .................... | A01K 15/024 119/706 |
| 2005/0039695 A1* | 2/2005 | Deming, Jr. | ......... | A01K 15/024 119/706 |
| 2007/0074675 A1* | 4/2007 | Tu | ......................... | A01K 15/024 119/706 |
| 2009/0050072 A1* | 2/2009 | Moser | .................. | A01K 15/024 119/706 |
| 2010/0050953 A1* | 3/2010 | Fails, Jr. | ............... | A01K 15/024 119/706 |
| 2012/0132149 A1* | 5/2012 | Yu | .......................... | A01K 15/024 119/706 |
| 2015/0122198 A1* | 5/2015 | Voronenko | ........... | A01K 15/024 119/706 |

* cited by examiner

*Primary Examiner* — Muhammad Ijaz (57) ABSTRACT

Multi-purpose adapter for mounting the feline activity devices is a utility device serving as an intermediary between the household surfaces and various accessory devices for cats. This device makes possible the convenient and fast installation of the cat scratchers, nests, rungs and other feline devices on almost any kind of a surface. This is achieved, on the one hand, by offering the large selection of mounting clips. On the another hand, the unified device-coupling option consisting of a simple pair of the pan-head screws makes it really easy to attach the feline devices to the adapter in unified way. This all allows a wide range of standard feline entertainment and active devices to be installed in such places and on such surfaces and objects, where it would be impossible without this invention.

20 Claims, 12 Drawing Sheets

MULTI-PURPOSE ADAPTER FOR MOUNTING FELINE ACTIVITY DEVICES

FIELD OF THE INVENTION

Multi-purpose adapter is a device designed for facilitating the installation of various cat activity devices by offering an option of an easy device mounting on various household surfaces. This multi-purpose adapter is equipped with the replaceable mounting clips for various surfaces on one side and the bi-directional coupling brackets unified for all cat activity devices on the opposite side of the device. It creates enough opportunities for easing the setup of the comfortable living conditions for cats and their owners.

BACKGROUND OF THE INVENTION

Multi-purpose adapter is a device intended to unify the use of different types of appliances for the cats. Once set up, it allows installation of different accessories for cats on it. Those include scratching pads, rungs for climbing, shelves or nests and gaming appliances. Availability of a series of removable mounting clips for a variety of surfaces turns the multi-purpose adapter into a portable device, allowing it to be quickly attached and re-attached in different places and on different surfaces. The device has simple built-in bi-directional coupling brackets for attaching different kind of feline activity devices to it. The main principle of operation is clamping the coupling screws on the appliance with the built-in bi-directional coupling bracket of the device platform. The simplicity of the construction allows the variety of the cat activity devices to be installed on a number of the household surfaces in a way that does not cause damage to the surface.

SUMMARY OF THE INVENTION

Multi-purpose adapter is a device acting as a coupling between the surface and the end-usage device for cats. This adapter has a compact size and a wide range of mounting clips for mounting on various surfaces. Structurally, the multi-purpose adapter consists of the unified multi-role platform and the set of several mounting clips specifically designed for different surfaces. All mounting clips for the surfaces are unified with the multi-role platform. They are being installed in dedicated grooves, recesses and slots on a rear side of the platform. They are quickly removable, interchangeable and allow fast mounting of the multi-purpose adapter on a surface. The unified multi-role platform is housing two built-in bi-directional coupling brackets for mounting various accessories for cats on its front side. Due to its bidirectionality the multi-purpose adapter does not have a fixed top-bottom position and can be mounted on the surface by any side up. The accessories that can be used with the adapter may include the devices for the animal comfort or entertainment such as rungs for climbing, shelves, nests and scratching pads. Adapter allows the attachment of the devices of arbitrary sizes and shapes. The only requirement for the attaching device is to have one or two coupling screws with the pan head. Light or small accessory device requires a presence of just one connecting screw. Heavier devices like rungs for climbing, shelves and scratching pads require more rigid mounting with the two coupling pan-head screws. Multi-purpose adapter is equipped with several mounting clips for mounting on various types of surfaces. Those are as follows:

The mounting clips with the needle/pins for the soft fabric surfaces

The mounting clips with the crimping brackets for different protrusions of the walls and pieces of furniture The mounting clips with the suction cups for smooth glossy planes such as glass doors and windows The mounting clips with the adhesive tape for the flat smooth surfaces of the furniture and walls The mounting clips with the tightening clamps for connecting to the protruding elements such as table legs and pipes.

DETAILED DESCRIPTION OF THE INVENTION

Figure 1:
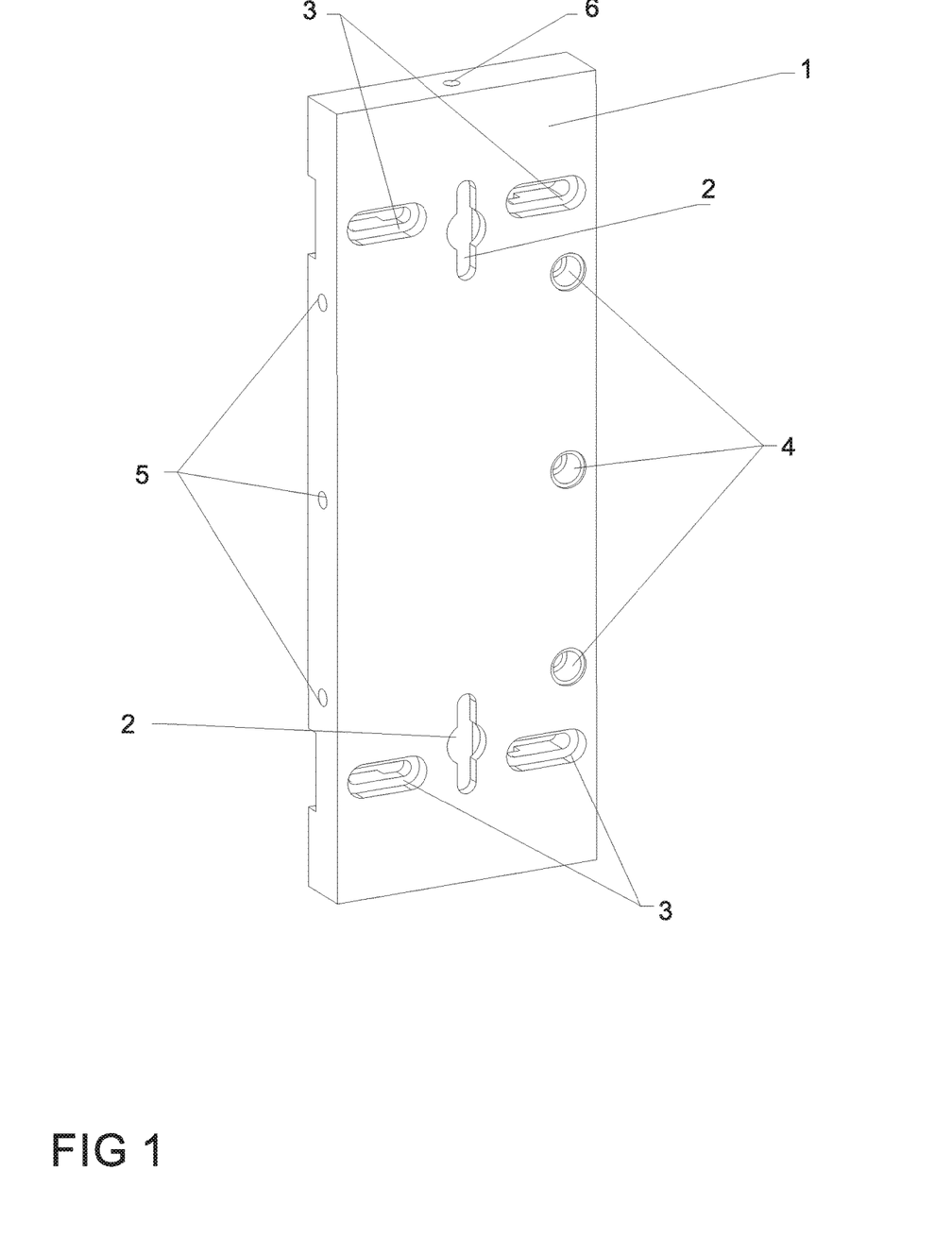
FIG. 1. The front side of the unified multi-role platform
Figure 2:
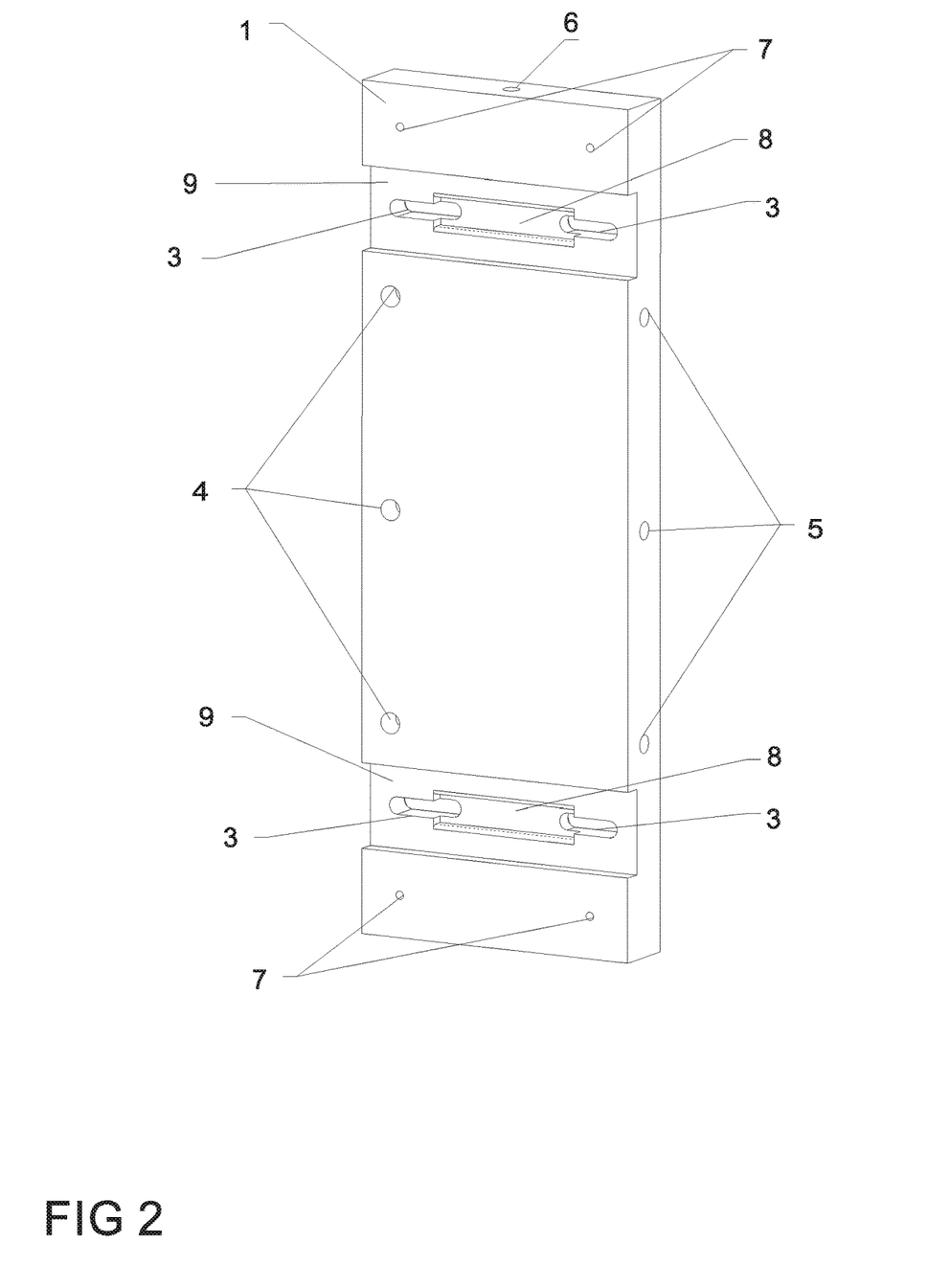
FIG. 2. The rear side of a unified multi-role platform
Figure 8:
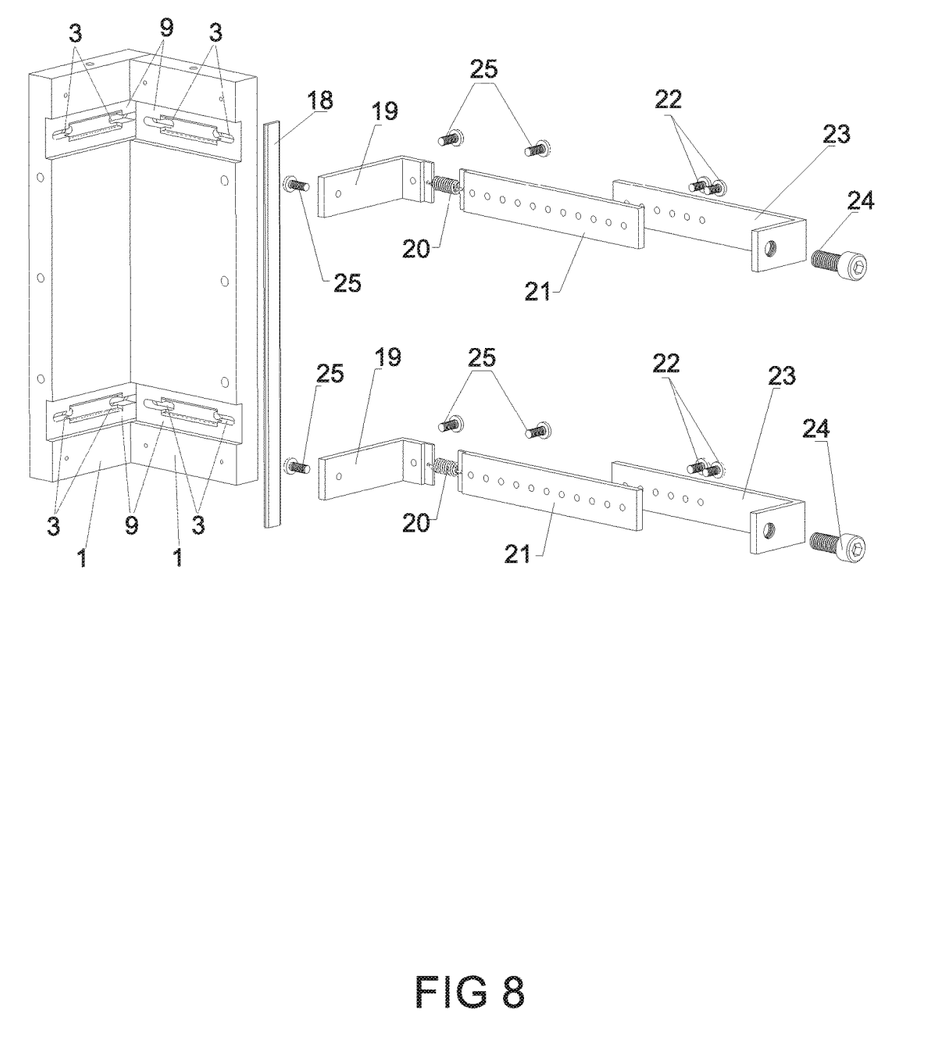
Figure 9:
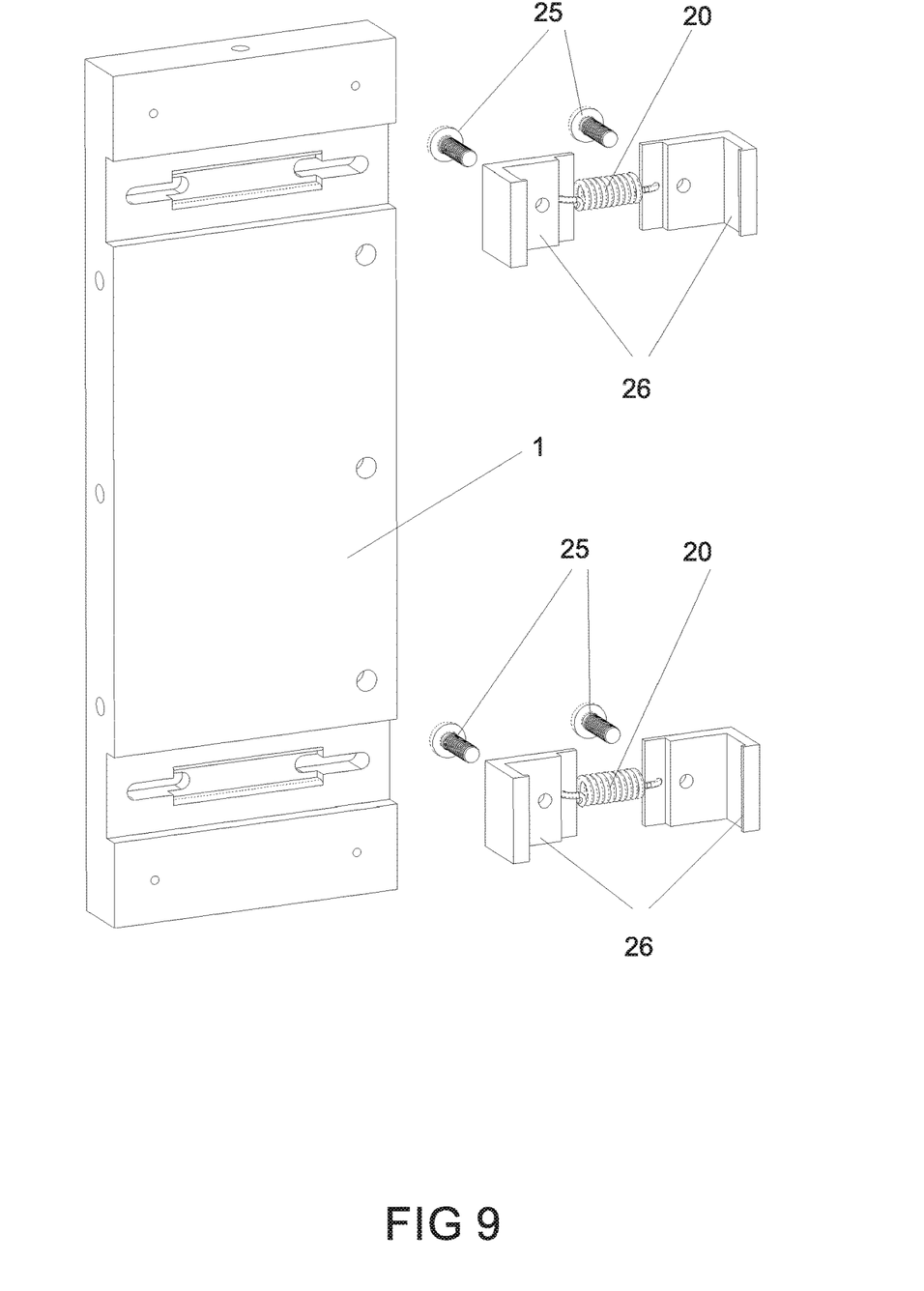
Figure 10:
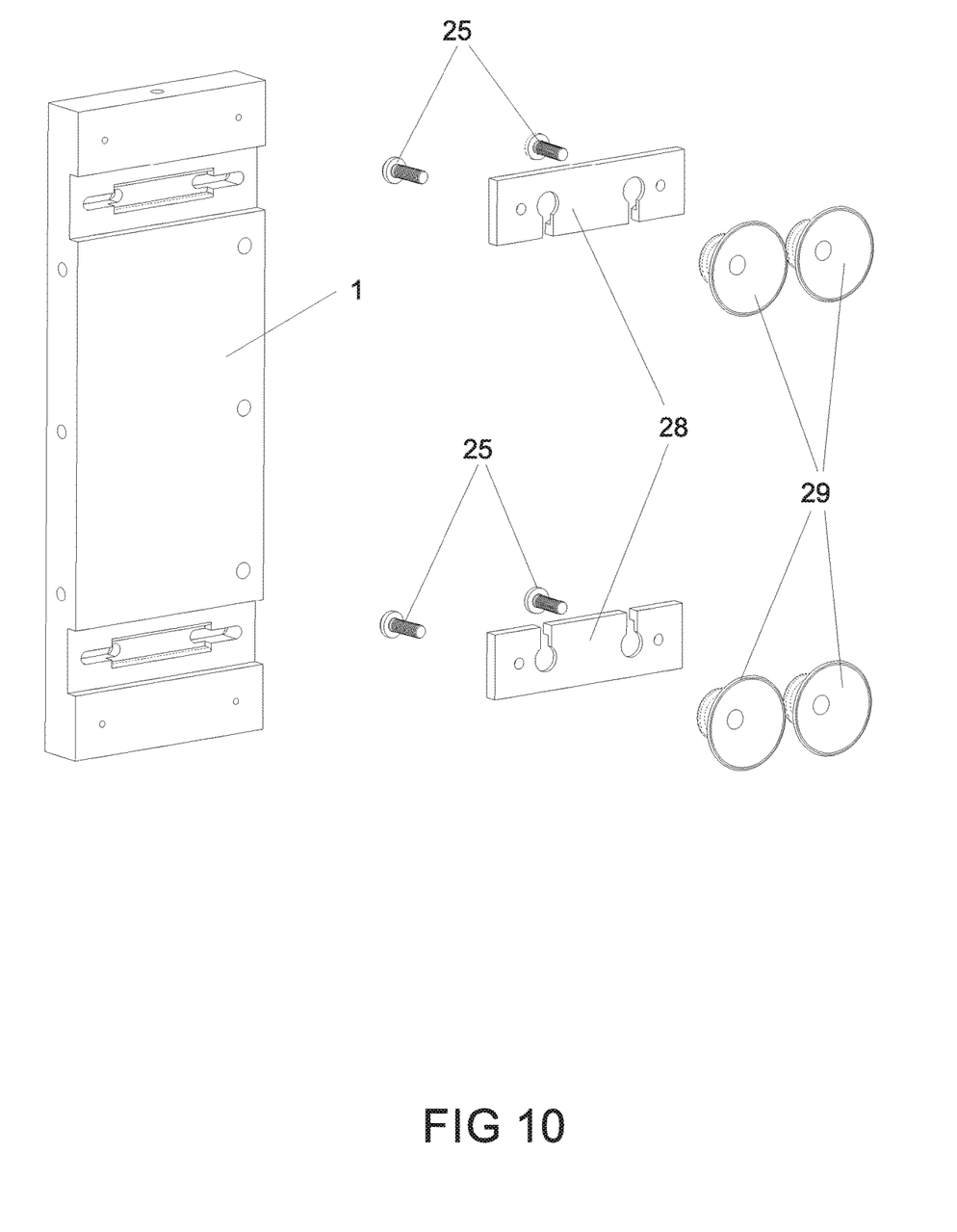
Figure 12:
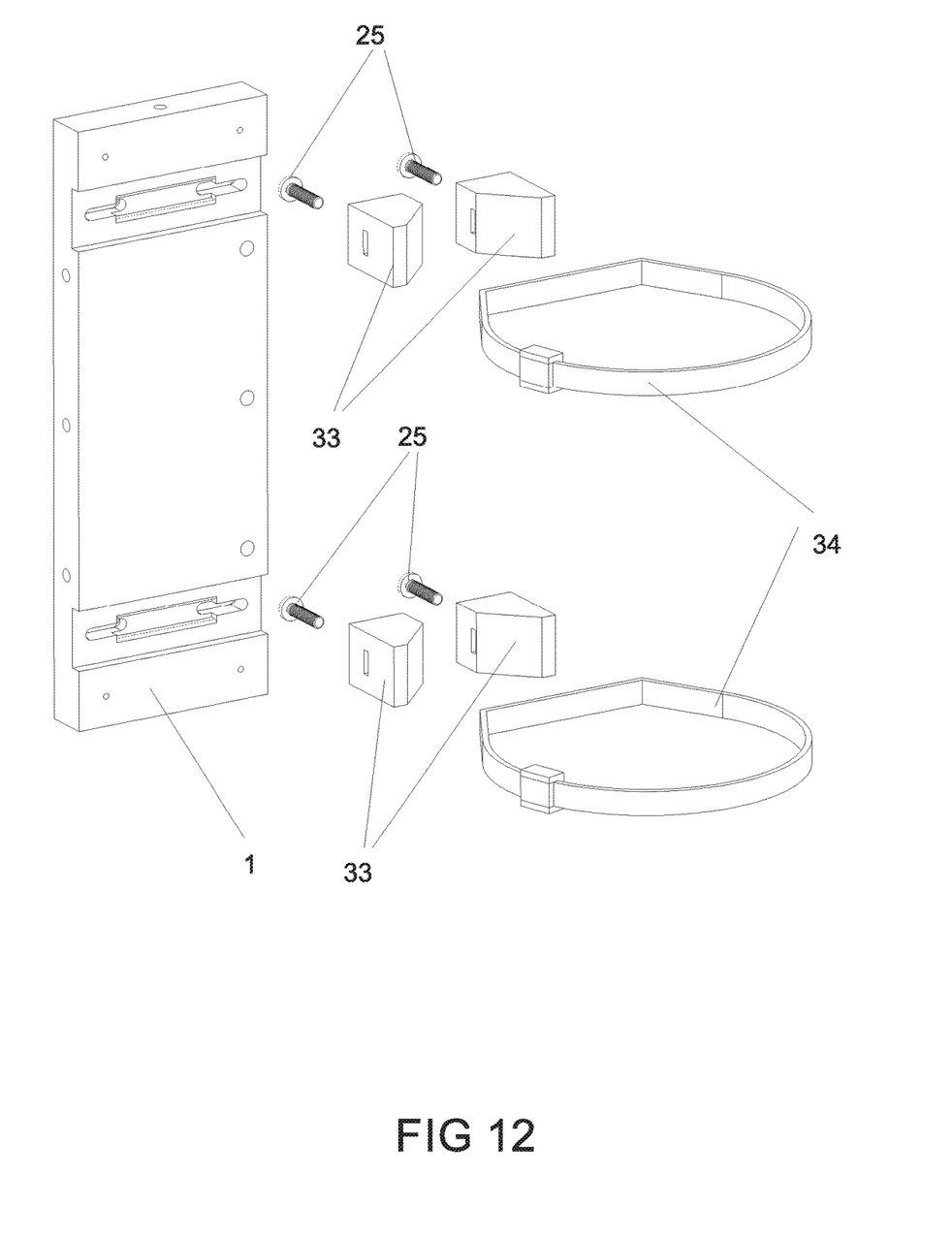

Drawings FIG. 1 and FIG. 2 show the unified multi-role platform 1 of the multi-purpose adapter. The platform 1 is built as all-in-one and indivisible element. It is equipped with the number of multiple required holes, recesses, grooves and slots for the unification with all the interchangeable and removable mounting clips, presented on FIGS. 7, 8, 9, 10, 11 and 12. To ensure the reliability of the multi-purpose adapter, the multi-role platform is assumed to be made from a rigid plastic material. The views FIG. 1 and FIG. 2 show the front side of the platform. Similarly, the rear side is shown on the FIG. 2. The following elements: the transverse-through slot 3, groove 8, longitudinal groove 9, screw recesses 5, 6, 7, and holes 4, identical for all types of the mounting clips—are those that ensure the unification feature of the multi role-platform. Transverse slits 3 are for inserting the unified screws 25 that can secure the following elements:

fixed supporting bracket 19 and fixed movable lengthening insert 21 in the mounting clip on the elongated crimping bracket (shown on FIG. 8)

portable short bracket 26 in the mounting clip on the brackets on the short crimping brackets (shown on FIG. 9)

suction cup holders 28 in the mounting clip on suction cups (shown on FIG. 10)

portable supports of the clamps 33 in the mounting clip on tightening clamps (shown on FIG. 12).

Figure 3:
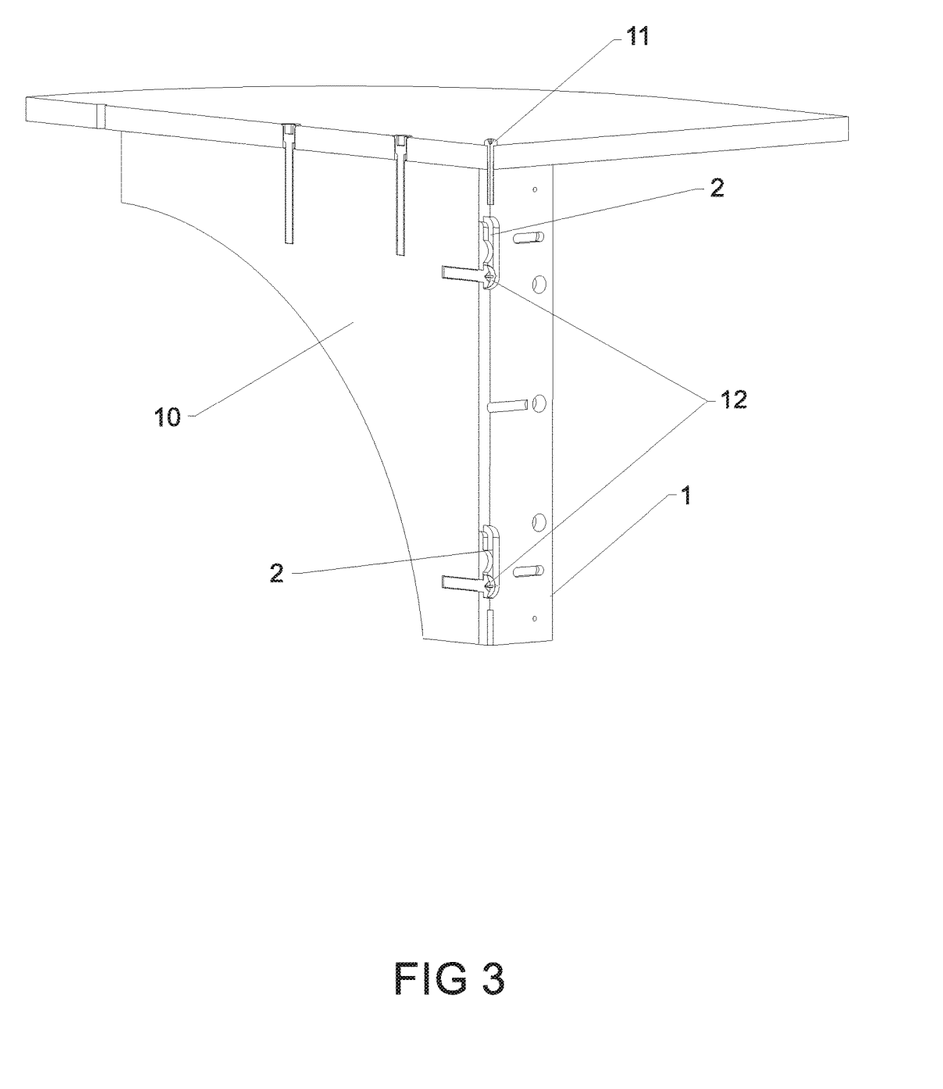
FIG. 3. The illustration of the invention use case with the sectional view of the feline nest attached to the unified multi-role platform FIG. 4. The illustration of the invention use case with the sectional view of the scratching pad attached to the unified multi-role platform FIG. 5. The illustration of the invention use case with other examples of possible feline activity devices attached to the multi-purpose adapter FIG. 6. The combination of two unified multi-role platforms in L-shaped device FIG. 7. The multi-purpose adapter assembly with the mounting clip on the needle/pins FIG. 8. The multi-purpose adapter assembly with the mounting clip on the elongated crimping brackets FIG. 9. The multi-purpose adapter assembly with the mounting clip on the short crimping brackets FIG. 10. The multi-purpose adapter assembly with the mounting clip on the suction cups FIG. 11. The multi-purpose adapter assembly with the mounting clip on the adhesive tape FIG. 12. The multi-purpose adapter assembly with the mounting clip on the tightening clamps
Figure 4:
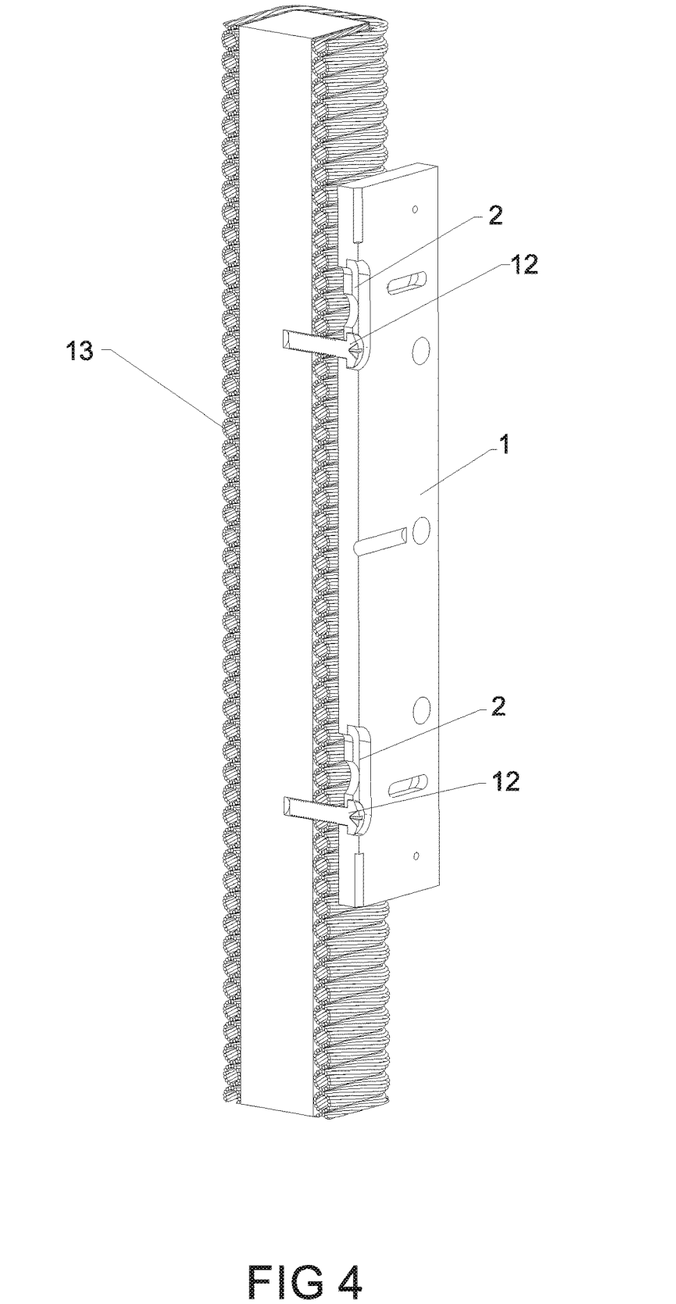
Figure 5:
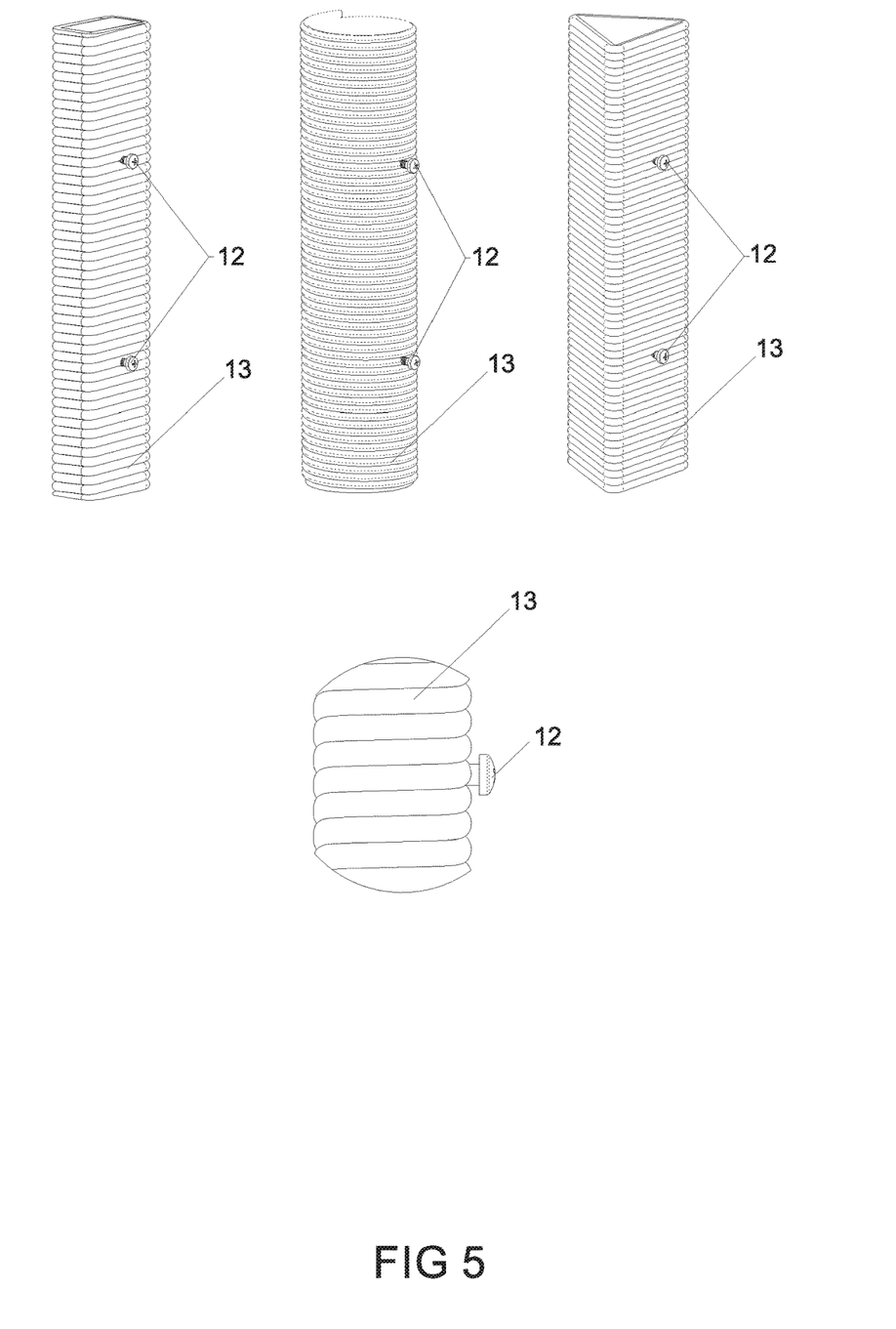
Figure 6:
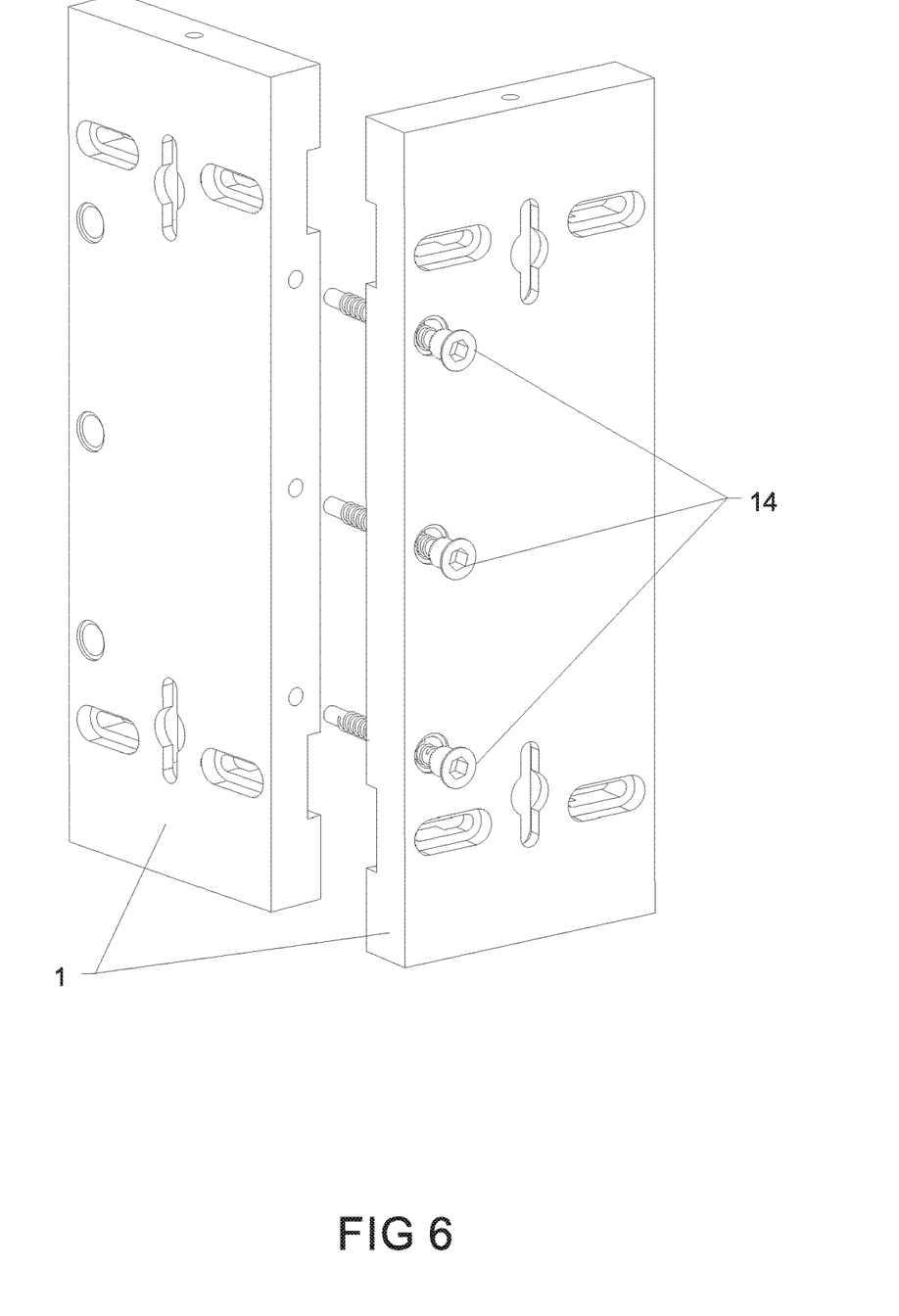

Screw recesses 6 for an auxiliary screws 11 are needed for more secure mounting of the feline shelves 10 with an auxiliary screw 11. Screw recesses 7 for needle/pin holder screws 17 are required for mounting the needle/pin holder 16 used in the mounting clip on the needle/pins of the FIG. 7. The purpose of spring groove 8 is to house the tightening spring 20 which is a part of the mounting clip on the elongated crimping brackets of the FIG. 8 and short crimping brackets of the FIG. 9. Holes 4 and related screw recesses 5 are used to combine the two unified multi-role platforms 1 into the single L-shape formation used for installing the mounting clip on the elongated crimping brackets. Two platforms are combined into the L-shape with the aid of the tightening-up screws 14 as shown on FIG. 6. This view demonstrates the L-shaped assembly. Two embedded bi-directional coupling brackets 2, located on the front side of the unified multi-role platform 1, are used as a coupling clip for different feline accessory devices. The bidirectionality of the brackets makes the top and bottom side of the multi-purpose adapter interchangeable. The operating principle of built-in bi-directional coupling brackets is shown in FIGS. 3 and 4. Attachments of the feline shelve 10 (The FIG. 3.) and of the scratching pad 13 (The FIG. 4) are demonstrated exclusively as an example. All cat's activity or entertainment devices are being attached to the multi-purpose adapter with the aid of the coupling pan-head screw 12 shown in FIG. 5. The pan-head coupling screw 12 of the scratching pad 13 is shown on the enlarged view FIG. 5. The sectional view FIG. 3 gives an example of the attaching the feline nest 10 to the unified multi-role platform 1 of multi-purpose adapter. The head of the coupling pan-head screw 12 enters the round opening in the built-in bi-directional coupling bracket 2. Then it becomes locked there by moving towards the narrowing path until it is fully fixed. Another example of attaching the feline accessory to the platform is shown in the sectional view FIG. 4. Here, the scratching pad 13 is attached to the unified multi-role platform 1 of the multi-purpose adapter in a very similar way to the feline nest. It is the basic way of attaching any device equipped with coupling pan-head screw like the screw 12 shown in a view. The FIG. 5 presents few examples of the attachable feline activity devices such as rungs for climbing. Sizes and shapes of the accessory devices do not matter and could be arbitrary; the only requirement is the presence of the coupling pan-head screw 12. All these rungs are equipped with the coupling pan-head screws 12.

Figure 7:
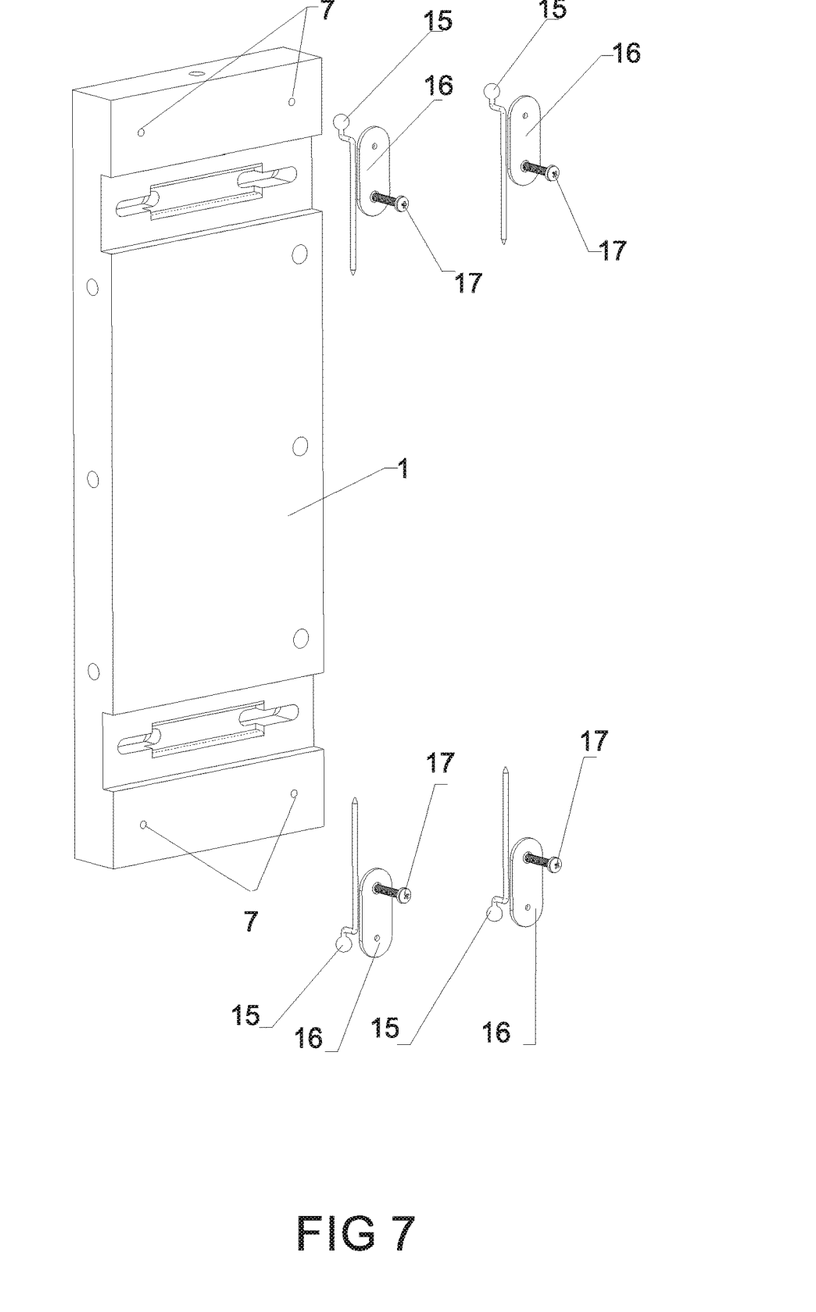

Removable mounting clip designed for mounting of the multi-purpose adapter on soft parts of furniture and carpeting is presented in FIG. 7. It is based on the usage of the needle/pins and its detailed construction is shown on FIG. 7. This mounting clip is composed of four needle/pin holders 16 which are mounted pairwise on opposite sides of the unified multi-role platform 1. The needle/pin holders 16 are mounted on the unified multi-role platform 1 with the aid of the screws 17 being screwed into the corresponding recess 7 of the platform. Each needle/pin 15 is going through the hole in the holder 16 and then is piercing the soft surface of a furniture.

Removable mounting clip on the elongated crimping brackets for mounting of the multi-purpose adapter on the large protrusions of walls or furniture is shown in FIG. 8. The FIG. 8 shows the dismantled view of a multi-purpose adapter with mounting clip on the elongated crimping brackets. The mounting clip is composed of the L-shaped adapter assembly with two fixed supporting brackets 19 and securing screws 25 placed in respective through slots 3 of the longitudinal grooves 9 of the adapter. The tightening springs 20 are attached to the fixed supporting brackets 19 on one end and to the movable elongating inserts 21 of the extension brackets 23—on other end. Portable elongating inserts 21 are placed in the corresponding longitudinal grooves 9 and are secured to the multi-role platform 1 with the screws 25, permitting the free adjustment of the portable lengthening inserts 21 along the whole length of the through slots 3. The inserts 21 are fixedly attached to the extension brackets 23 with the aid of the two screws 22. Both items: the elongating inserts 21 and the extension brackets 23 have perforated threaded holes for adjusting the total length of the mounting clip. The clamping screw 24, which is screwed into the extension bracket 23, is securing the attachment of the mounting clip to the surface. These screws regulate the tension in the tightening springs 20, determining the overall clamping force of the mounting clip. The strip 18 made of the silicone is attached to the multi-role platform 1 with double-sided adhesive tape to prevent the slippage of the adapter on the surface. The FIG. 8 brings the L-shaped adapter assembly with mounting clip on the elongated crimping brackets.

Removable mounting clip on short crimping brackets for mounting of the multi-purpose adapter on narrow ledges of furniture, walls or other interior constructs is presented in FIG. 9. The FIG. 9 shows the dismantled view of the multi-purpose adapter with mounting clip on short crimping brackets. This type of the mounting clip is composed of the multi-role platform 1 with four movable short brackets 26 installed in pairs in respective longitudinal grooves 9 on both sides of the platform. The movable short brackets 26 are tightened by the springs 20. These brackets 26 are secured to the platform 1 with the screws 25 that can move freely inside the through-in slots 3. The screws 25 allow the adjustment of the position of short brackets 26 along the length of the through slots 3. Crimping force of the mounting clip is achieved from stretching the tightening spring 20. During the multi-purpose adapter setup on the surface, two movable short brackets 26 have to be vertically fixed on either side by tightening the screws 25. Then the short brackets 26 on the opposite side have to be adjusted accordingly. The movable short brackets 26 can be installed on the door jambs. The multi-purpose adapter assembly with the mounting clip on the short crimping brackets in a whole is shown on FIG. 9.

Removable mounting clip on the suction cups for mounting the multi-purpose adapter on glossy and glass surfaces is presented in FIG. 10. The FIG. 10 presents the dismantled view of the mounting clip on suction cups explaining its construction in detail. This mounting clip is composed of the unified multi-role platform 1 with two fixed suction cup holders 28 set in respective longitudinal grooves 9; one on each side of the platform. The suction cup holders are fixed to the platform with the screws 25 sitting in the corresponding transverse-through slots 3. Each suction cup holder 28 is holding two suction cups 29. The clamping force of the fastening device is produced by the suction cups 29 at the time of pressing multi-adapter to the surface. The FIG. 10 shows the multi-purpose adapter with mounting clip on the suction cups, assembled.

Figure 11:
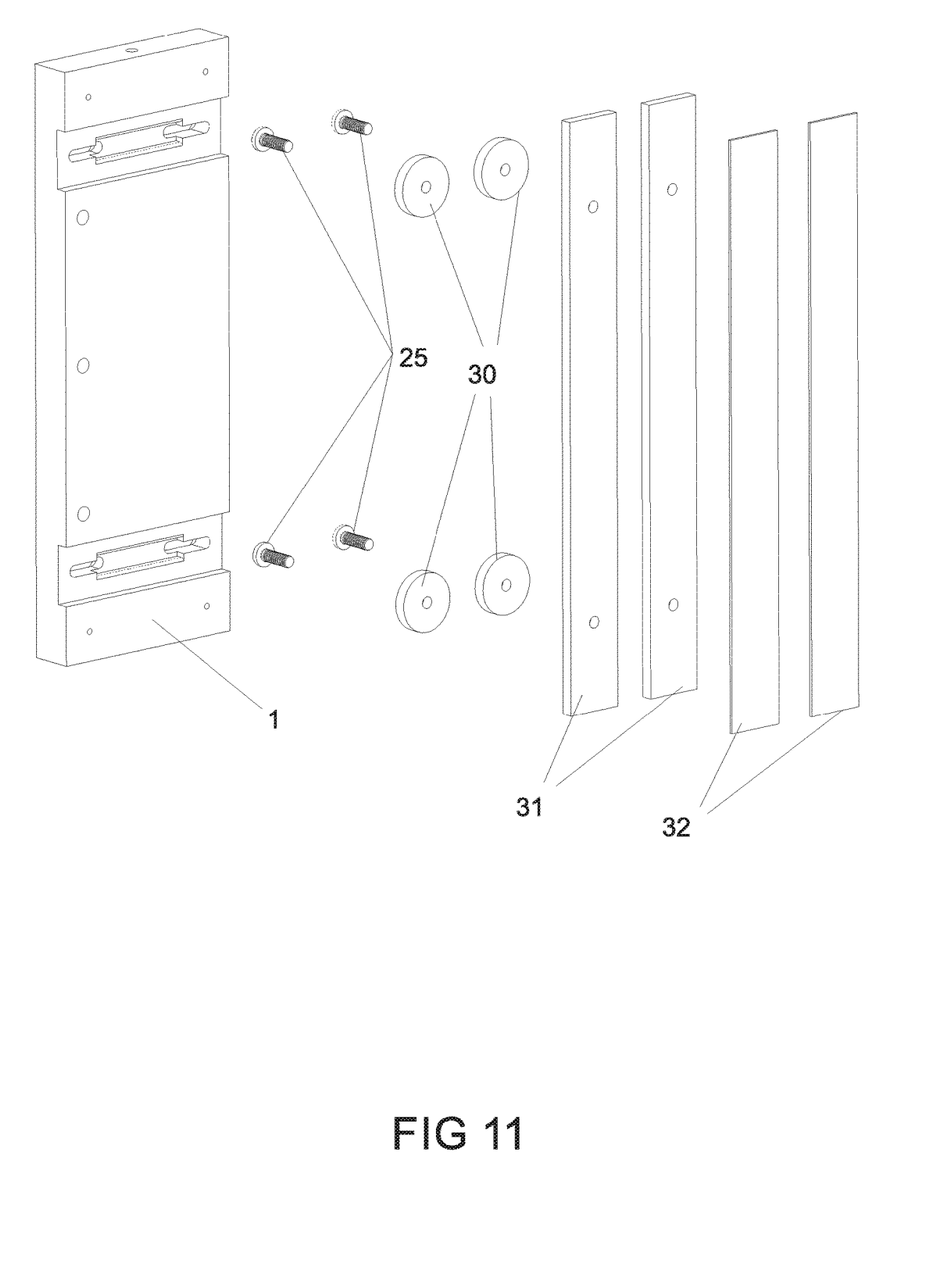

Removable mounting clip on the double-sided adhesive tape for mounting the multi-purpose adapter on smooth and not rough surfaces is presented in FIG. 11. The FIG. 11 shows the dismantled view of the adapter with this type of the mounting clip. Same as other discussed mounting clip types this clip is composed of the unified multi-role platform 1. Two flat support rails 31 are attached to the rear side of the platform. Each support rail creates a smooth surface for ensuring the secure attachment of the double-sided adhesive tape 32 to the platform. The support rails are screwed to the platform 1 with the unified screws 25. The washers 30 are used for compensating the thickness of the longitudinal grooves 9 and thus preventing the deformation of the support rails 31. The coupling effect of this type of the fastening device is achieved through sticking the double-sided adhesive tape to the surface. The FIG. 11 shows the multi-purpose adapter with the mounting clip on the double-sided adhesive tape, assembled.

The removable mounting clip on the tightening clamps for fastening the multi-purpose adapter on objects such as pipes, table legs and the like is shown in FIG. 12. The FIG. 12 shows the dismantled view of a multi-purpose adapter with the mounting clip on crimping clamps. This mounting clip is composed of the unified multi-role platform 1 and the crimping clamps 34. The latter ones are passing through the slots in the adjustable stops 33. The stops can slide along the grooves 9 during the adjustment but at the end are fixed in the grooves with the aid of the unified screws 25. The screws are also allowed to move within the transverse-through slots 3 for the adjustment purpose and the stops 33 are moving along with them. Overall, there are two crimping clamps in this construction with four movable stops that are placed in respective longitudinal grooves 9 in pairs on the opposite sides of the unified multi-role platform 1. The clamping force of this mounting clip is achieved due to the tightening of the crimping clamps 34 providing secure and reliable connection of the adapter.

The multi-purpose adapter is an installation system for feline devices, said installation system comprising at least one adapter (1) in form of a flat plate; said adapter comprising; a first flat surface, a second flat surface opposite to the first flat surface; a first flat side surface, a second flat side surface opposite to the first flat side surface; a flat top surface and a flat bottom surface positioned opposite to the flat top surface; a top portion, a bottom portion and a middle portion; wherein said middle portion is positioned between said top portion and said bottom portion; wherein said first flat surface comprising a plurality of first holes (4) proximal to the second flat side surface; each of said plurality of first holes comprising a first diameter; wherein said second flat surface comprising a plurality of second holes proximal to the second flat side surface; each of said plurality of second holes comprising a diameter smaller than the diameters of each of the plurality of second holes; said plurality of first holes coaxially aligned with said plurality of second holes to form a plurality of counter-bore holes (4); said first flat surface comprising; a first vertical slot (2) positioned on said top portion, said first vertical slot (2) comprising a first cutout communicating with the first vertical slot (2) and positioned at a center of said first slot (2), said first cutout having a width larger than the width of the first vertical slot; a second vertical slot (2) positioned on said bottom portion; said second vertical slot (2) comprising a second cutout communicating with said second vertical slot and positioned at a center of said second vertical slot (2), said second cutout having a width larger than the width of the second vertical slot (2); a plurality of first recesses (7) positioned on said top portion, and a plurality of second recesses (7) positioned on said bottom portion; wherein each of said plurality of second recesses (7) is aligned with the respective one of the plurality of first recesses (7); wherein each of said first plurality of recesses (7) and second plurality of recesses (7) comprising a diameter smaller than the diameter of the second plurality of holes; a plurality of first horizontal slots (3) positioned on said top portion, and a plurality of second horizontal slots (3) positioned on said bottom portion; wherein each of said plurality of second horizontal slot (3) is aligned with the respective one of the plurality of first horizontal slots (3); wherein each of said first plurality of recesses (7) and second plurality of recesses (7) comprising a diameter smaller than the diameter of the second plurality of holes; wherein said first vertical slot (2) is positioned between said plurality of first horizontal slots (3); wherein said second vertical slot (2) is positioned between said plurality of second horizontal slots (3); the top surface comprising a top screw recess (6); said second flat surface comprising; a first horizontal groove (8) positioned on said top portion; as shown in FIG. 2, said first horizontal groove (8) communicating with each of said plurality of first horizontal slots (3); a second horizontal groove (8) positioned on said bottom portion; said second horizontal groove (8) communicating with each of said plurality of second horizontal slots (3); a first longitudinal groove (9) extending horizontally from said first flat side surface to said second flat side surface; said first longitudinal groove (9) is positioned is positioned on said top portion; a second longitudinal groove (9) extending horizontally from said first flat side surface to said second flat side surface; said first longitudinal groove (9) is positioned on said bottom portion; said first horizontal groove (9) and said second horizontal groove (9) each comprising a rectangular shape; said first longitudinal groove (9) is axially aligned with said first horizontal groove (8) and said first horizontal slots (3); said second longitudinal groove (9) is axially aligned with said second horizontal groove (8) and each of said second horizontal slots (3); a first holding plate (28) said first holding plate (28) comprising; a plurality of first key-holes; each of said first key-holes configured for receiving a respective suction cup (29); and formed in an end of said first holding plate; a second holding plate (28); said second holding plate comprising; a plurality of second key-holes; each of said second key-holes configured for receiving a respective suction cup (29); and formed in an end of said second holding plate; a plurality of threaded fasteners (25 or 14); each of said first holding plate and second holding plate is configured to be received in the respective one of the first longitudinal groove and the second longitudinal groove; wherein said mounting system is configured for mounting the feline devices wherein said holders/clips/clamps (15-34) are interchangeable.

I claim:
1. An installation system for feline devices, said installation system comprising:
an adapter in form of a flat plate; said adapter comprising;
a first flat surface, a second flat surface opposite to the first flat surface;
a first flat side surface, a second flat side surface opposite to the first flat side surface;
a flat top surface and a flat bottom surface positioned opposite to the flat top surface;
a top portion, a bottom portion and a middle portion; wherein said middle portion is positioned between said top portion and said bottom portion;
wherein said first flat surface comprising a plurality of first holes proximal to the second flat side surface; each of said plurality of first holes comprising a first diameter;
wherein said second flat surface comprising a plurality of second holes proximal to the second flat side surface;

each of said plurality of second holes comprising a diameter smaller than the diameters of each of the plurality of second holes;

said plurality of first holes coaxially aligned with said plurality of second holes to form a plurality of counter-bore holes;

said first flat surface comprising;
   a first vertical slot positioned on said top portion, said first vertical slot comprising a first cutout communicating with the first vertical slot and positioned at a center of said first vertical slot, said first cutout having a width larger than the width of the first vertical slot;
   a second vertical slot positioned on said bottom portion; said second vertical slot comprising a second cutout communicating with said second vertical slot and positioned at a center of said second vertical slot, said second cutout having a width larger than the width of the second vertical slot;
   a plurality of first recesses positioned on said top portion, and
   a plurality of second recesses positioned on said bottom portion;
      wherein each of said plurality of second recesses is aligned with the respective one of said plurality of first recesses;
      wherein each of said plurality of first recesses and said plurality of second recesses comprising a diameter smaller than the respective diameters of said plurality of second holes;
   a plurality of first horizontal slots positioned on said top portion, and
   a plurality of second horizontal slots positioned on said bottom portion;
      wherein each of said plurality of second horizontal slots is aligned with the respective one of the plurality of first horizontal slots;
      wherein each of said plurality of first recesses and said plurality of second recesses comprising a diameter smaller than the diameter of said plurality of second holes;
   wherein said first vertical slot is positioned between said plurality of first horizontal slots;
   wherein said second vertical slot is positioned between said plurality of second horizontal slots;
   the top surface comprising a top screw recess;

said second flat surface comprising;
   a first horizontal groove positioned on said top portion; said first horizontal groove communicating with each of said plurality of first horizontal slots;
   a second horizontal groove positioned on said bottom portion; said second horizontal groove communicating with each of said plurality of second horizontal slots;
   a first longitudinal groove extending horizontally from said first flat side surface to said second flat side surface; said first longitudinal groove is positioned is positioned on said top portion;
   a second longitudinal groove extending horizontally from said first flat side surface to said second flat side surface; said first longitudinal groove is positioned on said bottom portion;
   said first horizontal groove and said second horizontal groove each comprising a rectangular shape;
   said first longitudinal groove is axially aligned with said first horizontal groove and said plurality of first horizontal slots;
   said second longitudinal groove is axially aligned with said second horizontal groove and said second horizontal slots;
a first holding plate;
   said first holding plate comprising;
   a plurality of first key-holes; each of said first key-holes configured for receiving a respective suction cup; and formed in an end of said first holding plate;
a second holding plate;
   said second holding plate comprising;
   a plurality of second key-holes; each of said second key-holes configured for receiving a respective suction cup; and formed in an end of said second holding plate;
a plurality of threaded fasteners;
each of said first holding plate and second holding plate is configured to be received in the respective one of the first longitudinal groove and the second longitudinal groove;
wherein said mounting system is configured for mounting the feline devices.

2. The installation system for the feline devices of claim 1, wherein said installation system further comprising: a plurality of portable short brackets.

3. The installation system for the feline devices of claim 1, wherein said plurality of portable short brackets comprising a substantially L-shaped cross-section.

4. The installation system for the feline devices of claim 3, wherein said plurality of portable short brackets comprising a tightening spring.

5. The installation system for the feline devices of claim 2, wherein said plurality of portable short brackets comprising a tightening spring.

6. The installation system for the feline devices of claim 1, wherein said installation system further comprising: a plurality of suction cups.

7. The installation system for the feline devices of claim 1, wherein said installation system further comprising: a plurality of washers.

8. The installation system for the feline devices of claim 7, wherein said installation system further comprising: a plurality of flat support rails.

9. The installation system for the feline devices of claim 1, wherein said installation system further comprising: a plurality of flat support rails.

10. The installation system for the feline devices of claim 9, wherein said flat support rails comprising adhesive tape.

11. The installation system for the feline devices of claim 1, said installation system further comprising a plurality of wedge-shaped clamps.

12. The installation system for the feline devices of claim 11, wherein said installation system further comprising a plurality of crimping clamps.

13. The installation system for the feline devices of claim 1, wherein said installation system further comprising a plurality of fixed supporting brackets (19), a plurality of movable lengthening inserts (21) and a plurality of extension brackets (23);
   wherein one of the plurality of fixed supporting brackets is connected one of a plurality of moveable lengthening inserts via one of plurality of tightening spring and one of the plurality of extension bracket is connected to one of the plurality of movable lengthening inserts via screws.

14. The installation system for the feline devices of claim 1, wherein said installation system further comprising a plurality of pin holders and a plurality of pins attached to the plurality of pin holders.

15. The installation system for the feline devices of claim 14, wherein said plurality of pins comprising a vertically elongated portion and a horizontally extending portion; said horizontally extending portion perpendicularly connected to the vertical portion.

16. The installation system for the feline devices of claim 15, wherein said plurality of pin holders comprising a flat surface.

17. The installation system for the feline devices of claim 1, wherein said installation system further comprising a second adapter in form of a plate said second adapter comprising: a first flat surface, a second flat surface opposite to the first flat surface; a first flat side surface, a second flat side surface opposite to the first flat side surface; a flat top surface and a flat bottom surface positioned opposite to the flat top surface.

18. The installation system for the feline devices of claim 17, wherein said second adapter further comprising a plurality of holes formed in said second flat side surface configured to be coaxially aligned with said plurality of counter-bore holes of said first adapter.

19. A mounting kit for feline devices, said mounting kit comprising:
  an adapter in form of a flat plate;
  at least one portable short bracket;
  at least one tightening spring;
  at least one suction cup;
  at least one washer;
  at least flat support rail;
  at least one adhesive tape;
  at least one wedge-shaped clamp;
  at least one crimping clamp;
  at least one fixed supporting bracket;
  at least one movable lengthening insert attachable to the fixed supporting bracket via the tightening spring;
  at least one of extension bracket attachable to the movable lengthening insert;
  at least one pin holder and at least one pin attachable to the pin holder;
  said adapter comprising;
    a first flat surface, a second flat surface opposite to the first flat surface;
    a first flat side surface, a second flat side surface opposite to the first flat side surface;
    a flat top surface and a flat bottom surface positioned opposite to the flat top surface;
    a top portion, a bottom portion and a middle portion; wherein said middle portion is positioned between said top portion and said bottom portion;
    wherein said first flat surface comprising a plurality of first holes proximal to the second flat side surface; each of said plurality of first holes comprising a first diameter;
    wherein said second flat surface comprising a plurality of second holes proximal to the second flat side surface;
      each of said plurality of second holes comprising a diameter smaller than the diameters of each of said plurality of second holes;
      said plurality of first holes coaxially aligned with said plurality of second holes to form a plurality of counter-bore holes;
  said first flat surface comprising;
    a first vertical slot positioned on said top portion, said first vertical slot comprising a first cutout communicating with the first vertical slot and positioned at a center of said first slot, said first cutout having a width larger than the width of the first vertical slot;
    a second vertical slot positioned on said bottom portion; said second vertical slot comprising a second cutout communicating with said second vertical slot and positioned at a center of said second vertical slot, said second cutout having a width larger than the width of the second vertical slot;
    a plurality of first recesses positioned on said top portion, and
    a plurality of second recesses positioned on said bottom portion;
      wherein each of said plurality of second recesses is aligned with the respective one of said plurality of first recesses;
      wherein each of said first plurality of recesses and second plurality of recesses comprising a diameter smaller than the diameter of the second plurality of holes;
    a plurality of first horizontal slots positioned on said top portion, and
    a plurality of second horizontal slots positioned on said bottom portion;
      wherein each of said plurality of second horizontal slots is aligned with the respective one of said plurality of first horizontal slots;
      wherein each of said plurality of first recesses and said plurality of second recesses comprising a diameter smaller than the diameter of said plurality of second holes;
    wherein said first vertical slot is positioned between said plurality of first horizontal slots;
    wherein said second vertical slot is positioned between said plurality of second horizontal slots;
    the top surface comprising a top screw recess;
  said second flat surface comprising;
    a first horizontal groove positioned on said top portion; said first horizontal groove communicating with each of said plurality of first horizontal slots;
    a second horizontal groove positioned on said bottom portion; said second horizontal groove communicating with each of said plurality of second horizontal slots;
    a first longitudinal groove extending horizontally from said first flat side surface to said second flat side surface; said first longitudinal groove is positioned is positioned on said top portion;
    a second longitudinal groove extending horizontally from said first flat side surface to said second flat side surface; said first longitudinal groove is positioned on said bottom portion;
    said first horizontal groove and said second horizontal groove each comprising a rectangular shape;
    said first longitudinal groove is axially aligned with said first horizontal groove and said plurality of first horizontal slots;
    said second longitudinal groove is axially aligned with said second horizontal groove and said second horizontal slots;
  a first holding plate;
    said first holding plate comprising;
    a plurality of first key-holes; each of said first key-holes configured for receiving a respective suction cup; and formed in an end of said first holding plate;

a second holding plate;
  said second holding plate comprising;
    a plurality of second key-holes; each of said second key-holes configured for receiving a respective suction cup; and formed in an end of said second holding plate;
a plurality of threaded fasteners;
each of said first holding plate and second holding plate is configured to be received in the respective one of the first longitudinal groove and the second longitudinal groove
  wherein said adapter is configured for mounting the feline devices.

20. The installation system for the feline devices of claim 17, wherein said
  at least one portable short bracket; at least one tightening spring; at least one suction cup; at least one washer; at least flat support rail; at least one adhesive tape; at least one wedge-shaped clamp; at least one crimping clamp; at least one fixed supporting bracket; at least one movable lengthening insert attachable to the fixed supporting bracket via the tightening spring; at least one of extension bracket attachable to the movable lengthening insert; at least one pin holder and at least one pin attachable to the pin holder is respectively
a plurality of portable short brackets; a plurality of tightening springs; a plurality of suction cups; a plurality of washers; a plurality of flat support rails; a plurality of adhesive tapes;
a plurality of wedge-shaped clamps; a plurality of crimping clamps; a plurality of fixed supporting brackets; a plurality of movable lengthening inserts attachable to the respective one of fixed supporting brackets via the respective one of tightening springs; a plurality of extension brackets attachable to the respective one of movable lengthening inserts; a plurality of pin holders and a plurality of pins.

* * * * *